US005665212A

United States Patent [19]
Zhong et al.

[11] Patent Number: 5,665,212
[45] Date of Patent: Sep. 9, 1997

[54] FLEXIBLE, CONDUCTING PLASTIC ELECTRODE AND PROCESS FOR ITS PREPARATION

[75] Inventors: Shihuang Zhong, Kensington; Michael Kazacos, Sylvania Heights; Maria Skyllas Kazacos, Sylvania; Vahid Haddadi-Asl, Hillsdale, all of Australia

[73] Assignee: Unisearch Limited ACN 000 263 025, Kensington, Australia

[21] Appl. No.: 397,096

[22] PCT Filed: Sep. 6, 1993

[86] PCT No.: PCT/AU93/00456

§ 371 Date: May 2, 1995

§ 102(e) Date: May 2, 1995

[87] PCT Pub. No.: WO94/06164

PCT Pub. Date: Mar. 17, 1994

[30] Foreign Application Priority Data

Sep. 4, 1992 [AU] Australia ............................ PL4504
Sep. 2, 1993 [TH] Thailand ............................. 0199944
Sep. 4, 1993 [CN] China ............................... 93119066.5

[51] Int. Cl.[6] ............................................. C25D 17/04
[52] U.S. Cl. ................ 304/297 R; 204/280; 204/290 R; 204/291; 204/286; 204/294; 429/40; 429/42; 429/191; 429/192; 429/212; 429/213; 429/218; 429/232; 429/233; 429/241; 252/500; 252/502; 428/408

[58] Field of Search .................... 429/40, 42, 191, 429/192, 212, 213, 218, 233, 232, 241; 204/279 R, 280, 290 R, 291, 294, 286; 252/500, 502; 428/408

[56] References Cited

U.S. PATENT DOCUMENTS

| 4,164,068 | 8/1979 | Snropshire | 29/623.1 |
| 4,379,814 | 4/1983 | Tsien et al. | 429/29 |
| 4,443,730 | 4/1984 | Kitamura et al. | 310/330 |
| 4,920,017 | 4/1990 | Herscovici | 429/42 |
| 5,051,325 | 9/1991 | Shishikura et al. | 429/218 |
| 5,190,695 | 3/1993 | Sotomura | 429/192 |

FOREIGN PATENT DOCUMENTS

| 0268397 | 5/1988 | Australia. |
| WO8905528 | 6/1989 | European Pat. Off.. |
| WO 90/12842 | 11/1990 | WIPO. |

OTHER PUBLICATIONS

International Search Report (Sep. 04, 1992).
Abstract of Japanese Application No. JP 880134998, filed Jun. 01, 1988.

Primary Examiner—Bruce F. Bell
Attorney, Agent, or Firm—Morgan & Finnegan, LLP

[57] ABSTRACT

Conducting plastic electrodes and methods of preparing such electrodes are disclosed. The electrodes comprise a thermo-plastic polymer, an elastomeric polymer, and a conductive filler material.

42 Claims, 6 Drawing Sheets

FLEXIBLE, CONDUCTING PLASTIC ELECTRODE AND PROCESS FOR ITS PREPARATION

TECHNICAL FIELD

The present invention is directed to a flexible, conducting plastic electrode and a process for the preparation of the same. The electrodes have application in redox flow batteries, particularly vanadium redox flow batteries, as well as in other electrochemical applications such as electrodepositing and electrowinning.

BACKGROUND ART

The desired characteristics for electrode materials which are to be used in redox cells to and other electrolytic processes include: low electrical resistivity, good mechanical properties and chemical stability and optionally low weight and low volume. The electrode material should not be attacked by reactants or products during cell operation. Thus there is a need for an electrode material which has good mechanical properties to withstand the hydraulic pressure and cell assembling operation without cracking and which is solution impermeable so that penetration and attack of the metal current collector (in end-electrodes) and loss in current efficiency (due to electrolytes crossing the bipolar electrodes) is low.

OBJECTS OF THE INVENTION

Objects of the present invention are to provide a flexible, conducting plastic electrode and a process for the preparation of the same.

DISCLOSURE OF THE INVENTION

The present inventors have surprisingly found that by combining a thermo-plastic polymer, an elastomeric polymer and a conductive filler material, a superior flexible, conducting plastic electrode is produced which has good physical strength, chemical stability and electrical conductivity. In particular, the inventors have found that by combining, for example, high density polyethylene (HDPE) resin, an elastomeric polymer such as, for example, styrene-ethene/butene-styrene (SEBS) block copolymer and conductive filler material such as carbon black particles or a mixture of carbon black particles and graphite fibres, a commercially useable plastic electrode is produced.

According to a first embodiment of this invention there is provided a flexible, conducting plastic electrode comprising:

(a) a conductive filler material;

(b) a thermo-plastic polymer; and (c) an elastomeric polymer at least partially cross-linked with (b);

wherein the amount of (a) is such that the electrode is electrically conducting and the degree of cross-linking of (b) with (c) is such that the electrode is flexible and has high tensile strength.

According to another embodiment of this invention there is provided a flexible, conducting plastic electrode comprising:

(a) a conductive filler material;

(b) a thermo-plastic polymer: and (c) an elastomeric polymer;

wherein the amount of (a) is such that the electrode is electrically conducting and the amounts of (a):(b):(c) are such that the electrode is flexible and has high tensile strength.

The conducting plastic electrode of the first embodiment may be pressure and heat welded onto at least one metal mesh, a metal mesh and graphite felt or at least one graphite felt. Hence, in the case when the electrode is in the form of a sheet the following configurations may be employed, for example:

(1) a metal mesh may be pressure and heat welded onto at least one side of the sheet;

(2) a metal mesh may be pressure and heat welded onto one side of the sheet and a graphite felt pressure and heat welded onto the other side of the sheet;

(3) a graphite felt may be pressure and heat welded onto at least one side of the sheet; and (4) a metal mesh sheet or foil may be pressure and heat welded between two of the flexible, conducting plastic electrodes.

Carbon and graphite felts are generally woven from yarns which are bundles of individual carbon monofilaments generally having a diameter in the range from about 1 to 50 µm, usually in the range from about 5 to 10 µm. The yarns will typically include from about 100 to 20,000 monofilaments, usually having from about 3,000 to 6,000 filaments. The denier of the yarns used as in fabricating the carbon felts will typically be in the range from about 500 to 5,000 mg/m, usually being in the range from about 1,000 to 2,000 mg/m. Denier is equal to the number of grams which yield 9,000 meters of the yarn or filament. The yarns are woven by conventional weaving machines yielding large fabrics which may be cut into the desired dimensions for the electrode. Each electrode may employ a plurality of layers of the fabric, so that the final dimensions of the electrode may vary widely.

According to a second embodiment of this invention there is provided a process for making a flexible, conducting plastic electrode, the process comprising:

(a) mixing a thermo-plastic polymer, an elastomeric polymer and conductive filler material, the mixing being at a temperature(s) above the melting point temperatures of the thermo-plastic polymer and the elastomeric polymer.

(b) pressure moulding (or extrusion moulding or injection moulding or calendering or veneering) the mixture of (a) at a temperature(s) above the melting temperatures of the thermo-plastic polymer and the elastomeric polymer until the polymers are at least partially cross-linked wherein the degree of cross-linking of the thermo-plastic polymer with the elastomeric polymer is such that the electrode is flexible and has high tensile strength, and (c) cooling the cross-linked polymerized mixture of (b) to form the electrode;

wherein the amount of the conductive filler material is such that the electrode is electrically conducting.

According to a further embodiment of this invention there is provided a process for making a flexible, conducting plastic electrode, the process comprising:

(a) mixing a thermo-plastic polymer, an elastomeric polymer and conductive filler material, the mixing being at a temperature(s) above the melting point temperatures of the thermo-plastic polymer and the elastomeric polymer, (b) pressure moulding (or extrusion moulding or injection moulding or calendering or veneering) the mixture of (a) at a temperature(s) above the melting temperatures of the thermo-plastic polymer and the elastomeric polymer until the mixture results in an electrode which is flexible and has high tensile strength, and (c) cooling the cross-linked polymerized mixture of (b) to form the electrode; wherein the amount of the conductive filler material is such that the electrode is electrically conducting.

Generally, during the pressure moulding (or other moulding) the pressure forces the mixture to fill the mould cavity.

Typically in step (c) the polymerized mixture of (b) is cooled rapidly, for example, typically 1°–10° C. per minute, more typically 2° to 5° C. per minute.

The process may also include:

(b)(i) adding a polymerization initiator to the mixture of (a) to at least partially cross-link the thermo-plastic polymer with elastomeric polymer.

The process may also include:

(d) adding a plastics additive(s) to the mixture of (a).

The process of the second embodiment may further include the step of pressure and heat welded onto at least one metal mesh, a metal mesh and graphite felt or at least one graphite felt onto at least one conducting plastic electrode.

Also included within the scope of this invention is a conducting plastic electrode when prepared by the method of the second embodiment.

Generally during the pressure moulding the pressure forces the mixture to fill the mould cavity.

Generally, the moulding pressure-during elevated pressure step (c) is from 2–2500 Kg/cm$^2$, more typically 2–500 Kg/cm$^2$ and even more typically, 2–300 Kg/cm$^2$. Generally, the temperature in step (b) is in the range 100°–750° C., typically 170°–350° C., and more typically 150°–260° C. Generally, the pressure and elevated temperatures are simultaneously applied for at least 15 to 30 minutes, more generally 25 minutes to 60 minutes and up to 6 hours or more. Alternatively, a 10 to 30 minute preheat (typically 20 minutes at 100°–750° C., more typically 120°–400° C.) followed by a compression which is gradually increased up to 30–70 tons, more typically 40–50 tons where it is held typically for 15–60 minutes, more typically 30 minutes at a temperature at the above conditions. The mould is then cooled down to room temperature over 1.5–4 hours, typically over 2 hours. To prepare an end-electrode, a metal mesh (such as copper) or alternative as listed elsewhere in this specification is placed in the bottom of the mould. The carbon-plastic sheet is placed on top and the mould preheated up to 100°–750° C., more typically 120°–400° C. The temperature is maintained for 15–60 minutes, more typically 30 minutes, before applying gradually increased pressure up to 30–70 tons, more typically 40–50 tons where it is held typically for 15–90 minutes, more typically 60 minutes. While keeping the hot carbon-plastic sheet with the metal mesh backing in mould, a window of desired area e.g. 300×500 mm$^2$ is placed on the top of the hot sheet and a graphite felt is placed in the window. A pressure of 1–6 tons, typically 2 tons, is then applied to the mould with the window, and this is maintained for 20–90 minutes, typically 30 minutes. The mould is then cooled down to room temperature to obtain the carbon-plastic and graphite felt composite end-electrode.

The conductive filler material has high conductivity and is present in sufficient amounts to allow for interparticle contact between the filler species so that the electrode is electrically conducting. The filler material may comprise one or more of the following materials: carbon black, graphite, metal powder, metallized glass fibres, polypyrrole powder, pitch-derived carbon fibres, graphite fibres, polyacrylonitrile-derived carbon fibres and polyacrylonitrile-derived graphite fibres. Typically, the filler material is comprised of carbon black by itself or a mixture of carbon black and graphite fibres (in a range of 5–70 wt % of the total composition. The ratio of carbon black to graphite fibres is typically in a range of 5:95 to 99:1 wt % more typically in a range of 30:70 to 70:30 wt % and even more typically 95:5 wt %. Generally, at least two different types of carbon black are used, for example fine carbon black powder (2–35 nm) and coarse carbon black powder (35 nm–10,000 nm) in a ratio of fine carbon:coarse carbon of from 1:99 to 99:1. In particular, a weight ratio of total carbon content to polymer of 2:3 in the electrode of the invention has good electrical conductivity while maintaining excellent physical strength and flexibility.

In the electrode, the thermo-plastic is the basic polymer which maintains the plastic properties of the composite and is generally 10–80 wt % more typically 20–70 wt % of the electrode. If the weight fraction of the thermo-plastic is too low there will be a resultant unacceptable loss of the plastic properties of the electrode. If the weight fraction of the thermo-plastic is too high there will be a resultant unacceptable decrease in electrical conductivity of the electrode.

Examples of thermo-plastic polymers include, by way of illustration only, end-capped polyacetals, such as poly (oxymethylene) or polyformaldehyde, poly (trichloroacetaldehyde), poly(n-valeraldehyde), poly (acetaldehyde), poly(propionaldehyde), and the like; acrylic polymers, such as polyacrylamide, poly(acrylic acid), poly (methacrylic acid), poly(ethyl acrylate), poly(methyl methacrylate), and the like; fluoro-carbon polymers, such as poly(tetrafluoroethylene), perfluorinated ethylene-propylene copolymers, ethylene-tetrafluoroethylene copolymers, poly (chlorotrifluoroethylene), ethylene-chlorotrifluoroethylene copolymers, poly(vinylidene fluoride), poly(vinyl fluoride), and the like; polyamides, such as poly(6-aminocaproic acid) or poly (e-capro-lactam), poly(hexamethylene adipamide), poly(hexamethylene sebacamide), poly(11-aminoundecanoic acid), and the like; polyaramides, such as poly(imino-1,3-phenyleneiminoisophthaloyl) or poly(m-phenylene isophthalamide), and the like; parylenes, such as poly-p-xylylene, poly(chloro-p-xylylene), and the like; polyaryl ethers, such as poly(oxy-2.6-dimethyl-1,4-phenylene) or poly(p-phenylene oxide), and the like: polyaryl sulfones, such as poly(oxy-1,4-phenylenesulfonyl-1,4-phenylene-oxy-1,4-phenylene-isopropylidene-1,4-phenylene), poly (sulfonyl-1,4-phenyl-eneoxy-1,4-phenylenesulfonyl-4,4'-biphenylene), and the like; polycarbonates, such as poly (bisphenol A) or poly(carbonyldioxy-1,4-phenyleneisopropylidene-1,4-phenylene), and the like; polyesters, such as poly(ethylene terephthalate), poly (tetramethylene terephthalate), poly(cyclohexylene-1,4-dimethylene terephthalate) or poly(oxymethylene-1,4-cyclohexylenemethyleneoxyterephthaloyl), and the like; polyaryl sulfides, such as poly(p-phenylene sulfide) or poly (thio-1,4-phenylene), and the like; polyimides, such as poly (pyromellitimido-1,4-phenylene), and the like; C2–C12 polyolefins, such as polyethylene, polypropylene, poly(1-butene), poly(2-butene), poly(1-pentene), poly(2-pentene), poly(3-methyl-1-pentene), poly(4-methyl-1-pentene), 1,2-poly-1,3-butadiene, 1,4-poly-1,3-butadiene, polyisoprene, polychloroprene, polyacrylonitrile. poly(vinyl acetate), poly (vinylidene chloride), polystyrene, and the like; copolymers of the foregoing, such as acrylonitrile-butadiene-styrene (ABS) copolymers, and the like. The molecular weight of the thermoplastic polymer is typically in the range 25,000 to 500,000. more typically 30,000 to 300,000. Further examples of thermoplastic polymers may be found in "Polymer Handbook", editors J. Brandrup and E. H. Immergut, 3rd edition, John Wiley & Sons, New York, 1989, "Encyclopedia of Chemical Technology", Kirk-Othmer, 3rd Edition, John Wiley & Sons, New York, "Compounding Materials for the Polymer Industries", "Handbook of Thermoset Plastics", S. H. Goodman, Noyes Publications, Park Ridge, N.J. 1986, J. S. Dick, Noyes Publications, Park Ridge, N.J. 1987, and "Handbook of Plastics Materials and Technology", editor Irvin I. Rubin, John Wiley & Sons, New York, 1990, the contents of which are incorporated herein by cross reference.

A thermo-plastic is used herein to mean a thermo-plastic polymer which has moderate to high crystallinity or a glass temperature ($T_g$) above the operating conditions of the electrode. The $T_g$ is the temperature below which the polymer exhibits glasslike behaviour. One or more of the following are typical thermo-plastics which may be used in the electrode: low density polyethylene, high density polyethylene, polypropylene, polybutylene or polystyrene. In particular, high density polyethylene, is a suitable thermo-plastic for use in the electrode of the invention.

According to a further embodiment of this invention there is provided an all-vanadium redox battery having a positive compartment containing a catholyte in electrical contact with a positive electrode, the catholyte comprising an electrolyte containing tetravalent vanadium ions or pentavalent vanadium ions, a negative compartment containing an anolyte in electrical contact with a negative electrode, the anolyte comprising an electrolyte containing tetravalent vanadium ions, trivalent vanadium ions or divalent vanadium ions, and an ionic conducting separator disposed between the positive and negative compartments and in contact with the catholyte and anolyte to provide ionic communication therebetween and wherein the catholyte includes a salt of the formula $VO(X)_y$ where y is 2 and X is selected from F, Br or Cl or y is 1 and X is selected from $SO_4$ or O. $V_2O_5$, $V_2O_3$, $V_2O_4$, VO, $VSO_4$, $VOSO_4$, $V_2(SO_4)_3$, $(VO_2)_2SO_4$, and $NH_4VO_3$, and the concentration of the salt is 0.1M to 8.0M, more particularly 0.1M to 5.0M, and wherein at least one of the positive and negative electrodes is a conducting plastic electrode of the first embodiment or a conducting plastic electrode when prepared by the process of the second or third embodiments.

The electrochemical reactions of the redox cell can be conducted in any electrochemical cell which has an anode compartment and a cathode compartment through which the appropriate fluids can be transported. A particular redox cell in which the permeation selective membranes may be used to advantage is an all-vanadium battery described in U.S. Pat. No. 4,786,567, the contents of which are incorporated herein by cross reference.

Although the design of the electrode and cathode compartments of the redox cell are not critical to the practice of this invention, certain embodiments are preferred. For example, a parallel plate electrochemical cell in which anode and cathode compartments alternate in order to increase voltage and decrease current is a preferred embodiment. Generally, the electrodes will have a height in the range from about 1 cm to 100 cm, a width in the range from about 0.1 cm to 900 cm, more typically from about 5 cm to 300 cm, and a thickness in the range from about 0.02 cm to 3.0 cm, more typically 0.02 cm to 1.0 cm. The particular dimensions chosen will depend primarily on the capacity of the electrochemical cell.

The elastomeric polymer is the critical component for improving the flexibility of the composite under high pigment loading conditions (i.e. higher than 40 wt % loading with conducting filler). Examples of naturally occurring and synthetic elatomeric polymers are given in "Elastomers and Rubber Compounding Materials" Studies in Polymer Science I, I. Franta (editor), Elsevier, N.Y. 1989, "Compounding Materials for the Polymer Industries", J. S. Dick, Noyes Publications, Park Ridge, N.J. 1987, "Handbook of Elastomers", A. K. Bhowmick and H. L. Stephens (editors), Marcel Dekker, Inc., New York 1988 (see Chapter 9, in particular), and "Natural Rubber Science and Technology", A. D. Roberts (editor), Oxford University Press, 1988, the contents of all of which are incorporated herein by cross-reference. Particularly useful elastomeric polymers are thermoplastic styrene block copolymers such as diblock ("SB"), triblock ("SBS" or "SIS"), saturated triblock ("SEBS"), radial trichain, radial tetrachain, and radial multichain polymers or any combination thereof. For example, the styrenic block copolymers employed may be a combination of one or more of styrene-isoprene-styrene, styrene-butadiene-styrene, or styrene-(ethylene-butylene)-styrene. Typically, styrene-butadiene-styrene ("SBS") or styrene-(ethylene-butylene)-styrene ("SEBS") or a mixture thereof (e.g. in the ratio in the range 1:10 to 10:1 w/w) is used.

In an embodiment of the invention the elastomeric polymer concentration, for example styrene-butadiene (SB), styrene-butadiene-styrene (SBS), styrene-isoprene-styrene (SIS) or styrene-ethylene-butadiene-styrene (SEBS) block copolymer concentration or styrene-butadiene rubber (SBR), natural isoprene rubber (NR), carboxylic-butadiene-acrylonitrile rubber (XNBR), styrene-butadiene rubber/natural rubber composite (SBR-NR), SBR latex, NR latex, ethylenepropylene rubber (EPR), n-butyl rubber, isobutylene-high density polyethylene copolymer (BMX4[2]), santoprene, silicone rubber, synthetic polyisoprene rubber (IR), polypropylene (PP), polyisoprene (PIP), polyurethane elastomer (PU) rubber, chlorosulfonated polyethylene (CSM), chloroporene rubber (CR), butadiene rubber (BR), rubber with saturated chain based on acrylate copolymer (ACM), polybutadiene rubbers, isobutylene-isoprene rubber (IIR), polyisoprene rubbers, methylfluorosilicone rubber (MFQ), phenylvinylsilicone rubber (PPVQ), butadiene-isoprene rubbers, chlorinated polyethylene (CM), brominated isobutylene-isoprene rubber (BIIR), chlorinated isobutylene-isoprene rubber (CIIR), acrylonitrile-isoprene rubber (NIR), butadiene-piperylene rubbers, ethylene-propylene copolymer (EPM), methylvinylsilicone rubber (MVQ), tetrafluoroethylene-trifluoronitrosomethane-nitrosoperfluorobutyric acid copolymer rubber (AFMU), polyester type polyurethane rubber (AU), polyester type polyurethane rubber (EU), acrylonitrile-butadiene rubbers, XNBR latex, SBR-NR latex, carboxylated SBR, carboxylated NR, carboxylated SBR-NR, perfluropropylene-vinylidene fluoride copolymer (FKM), rubber with saturated chain based on copolymers of trifluoroethylene (CFM), acrylate-acrylonitrile copolymer (ANM), epichlorohydrin-based rubber (CO), ethyleneoxide-epichlorohydrin copolymer (ECO), polysulfide rubber (T), natural rubbers, acrylonitrile-butadiene rubber/polyvinyl chloride (NBR/PVC), Dimethylsilicone rubber (MQ), butadiene-propylene rubbers, methylphenylsilicone rubber (MPQ), ethylene-propylenediene terpolymer+EVA (EPDM+EVM), ethylene-vinyl acetate rubber (EVA), NBR or EPDM. is 0.1–50 wt % of the total electrode composition. The molecular weight of the elastomeric polymer is typically in the range 25,000 to 500,000, more typically 30,000 to 300,000. A higher proportion of styrenic block copolymer will give the electrode a rubber appearance. A lower proportion does not significantly improve the flexibility of the composite. A concentration in the range of 10–30 wt %, more particularly in the range of 15–25 wt % and even more particularly about 20 wt % of styrene-butadiene-styrene or is typically used.

A cross linking agent may be used to cross-link the thermoplastic polymer with the elastomeric polymer. The cross linking agent is generally chosen depending on the nature of the thermoplastic polymer and the elastomeric polymer. Examples include vinylidene chloride, vinyl acetate, styrene, acrylamide, 1,3 butadiene, methacrylic acid, vinyl chloride, acrylonitrile, 2-hydroxyethyl methacrylate, methyl methacrylate, may be chosen depending on the polyelectrolyte and ion exchange resin. Other examples of possible monomers for use as cross linking agents include: esters of acrylic and methacrylic acid such as methyl, ethyl, propyl, isobutyl, isopropyl, butyl, tert-butyl, sec-butyl, ethylhexyl, amyl, hexyl, octyl, decyl, dodecyl, cyclohexyl, isobornyl, benzyl, phenyl, alkylphenyl, ethoxymethyl, ethoxyethyl, ethoxypropyl, propoxymethyl, propoxyethyl, propoxypropyl, ethoxyphenyl, ethoxybenzyl, ethoxycyclohexyl, hydroxyethyl, hydroxypropyl, ethylene, propylene, isobutylene, diisobutylene, styrene, ethylvinylbenzene, vinylbenzylchloride, vinyltoluene, vinyl chloride, vinyl acetate, vinylidene chloride, dicyclopentadiene, acrylonitrile, methacrylonitrile, acrylamide, methacrylamide, diacetone acrylamide, neutral or half-acid half-esters or free diacids of the unsaturated dicarboxylic acids including itaconic, citraconic, aconitic, fumaric, and maleic acids, substituted acrylamides, such as N-monoalkyl, N,N-dialkyl and N-dialkylaminoalkylacrylamides or methacrylamides where the alkyl groups may have from one to eighteen carbon atoms, such as methyl, ethyl, isopropyl, butyl, hexyl, cyclohexyl, octyl, dodecyl, hexadecyl and octadecyl aminoalkyl esters of acrylic or methacrylic acid, such as b-dimethylaminoethyl, b-diethylaminoethyl or 6-dimethylaminohexyl acrylates and methacrylates, alkylthioethyl methacrylates and acrylates such as ethylthioethyl methacrylate, functional monomers such as vinylbenzene, sulfonic acid, vinyl esters, including vinyl acetate, vinyl propionate, vinyl butyrate, vinyl laurate, vinyl ketones including vinyl methyl ketone, vinyl ethyl ketone, vinyl isopropyl ketone, vinyl n-butyl ketone, vinyl -hexyl ketone, vinyl octyl ketone, methyl isopropenyl ketone, vinyl aldehydes including acrolein, methacrolein, crotonaldehyde, vinyl ethers including vinyl methyl ether, vinyl ethyl ether, vinyl propyl ether, vinyl isobutyl ether, vinylidene compounds including vinylidene chloride, vinylidene bromide, or vinylidene bromochloride, vinylpyridines, such as 2-vinylpyridine, 4-vinylpyridine, 2-methyl-5-vinylpyridine. Examples of polyethylenically unsaturated monomers include: divinylbenzene, divinylpyridine, divinylnaphthalenes, diallylphthalate, ethylene glycol diacrylate, ethylene glycol dimethacrylate, trimethylolpropanetrimethacrylate, divinylsulfone, polyvinyl or polyallyl ethers of glycol, of glycerol, of pentaerythritol, of diallyl malonate, diallyl oxalate, diallyl adipate, diallyl sebacate, divinyl sebacate, diallyl tartrate, diallyl silicate, triallyl tricarballylate, diethyleneglycol, of monothio-derivatives of glycols, and of resorcinol divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, and triallyl phosphate. N,N'-methylene-diacrylamide, N,N'-methylene-dimethacrylamide, N,N'-ethylenediacrylarnide, trivinylbenzene, trivinylnapthalenes, vinylanthracenes, including styrene, vinyl pyridine, vinyl naphthalene, vinyl toluene, phenyl acrylate, vinyl xylenes, ethylvinylbenzene, divinyl pyridine, divinyl naphthalene, divinylbenzene, trivinylbenzene, alkyldivinylbenzenes having from 1 to 4 alkyl groups of 1 to 6 carbon atoms substituted in the benzene nucleus, and alkyltrivinylbenzenes having 1 to 3 allyl groups of 1 to 3 carbon atoms substituted in the benzene nucleus. Further examples include aromatic diacids and their derivatives (the esters, anhydrides and acid chlorides) including phthalic acid, phthalic anhydride, terephthalic acid, isophthalic acid, dimethylphthalate, aliphatic dibasic acids such as maleic acid, fumaric acid, itaconic acid, 1,1-cyclobutane-dicarboxylic acid, aliphatic diamines such as piperazine, 2-methylpiperazine, cis, cis-bis (4-aminocyclohexyl) methane, metaxylylenediamine, glycols such as diethylene glycol, triethylene glycol, 1,2-butanediol, neopentyl glycol, bisehloro-formates such as cis and trans-1,4-cyclohexylbis-cbioroformate, 2,2,2,4-tetramethyl-1,3-cyclobutyl bischloroformate and bischloroformates of other glycols above listed, hydroxy acids such as salicylic acid, m- and p-hydroxy-benzoic acid and lactones, derived therefrom such as the propiolactones, valerolactones, caprolactones, diisocyantes such as cis and trans-cyclopropane-1,2-diisocyanate, cis and trans-cyclobutane-1,2-diisocyanate, phenol and derivatives of phenol, including, alkylphenols, polyfunctional cross-linking agents such as tri- or poly basic acids such as trimellitic acid, tri- or polyols such as glycerol, tri- or polyamines such as diethylenetriamine; and other condensation monomers and mixtures of thereof, aromatic aliamines such as benzidine, 4,4'-methylenediamine, bis(4-amino-phenyl)ether, bisphenols such as bisphenol A, bisphenol C, bisphenol F, phenolphthalein, resorcinol, bisphenol bis(chloroformates) such as hisphenol A bis(chloroformate), 4,4'-dihydroxybenzophenone bis(chloroformate), carbonyl and thiocarbonyl compounds such as formaldehyde, acetaldehyde thioacetone acetone. Examples of further monomers that may be used as cross linking agents are given in J. Brandup and E. H. Immergut, "Polymer Handbook", 3rd Edition, John Wiley and Sons, New York, 1989, the contents of which are incorporated herein by cross reference. For given set of circumstances, the amount of cross-linking agent to be used (typically 0.01–25 wt %, more typically 0.5–10 wt % and even more typically 0.75–5 wt %) may be readily determined by trial an error without undue experimentation.

To facilitate cross-linking an initiator such as dicumyl peroxide, for example, is used in concentrations of 0.01–10 wt % of the elastomeric polymer. Further examples of polymer initiators may be found in "Plastics Additives", E. W. Flick, Noyes Publications, Park Ridge, N.J. 1986, "Compounding Materials for the Polymer Industries", J. S. Dick, Noyes Publications, Park Ridge, N.J. 1987, "Chemical Additives for the Plastics Industry", Radian Corporation, Noyes Publications, Park Ridge, N.J. 1987, "Polymer Handbook", editors J. Brandrup and E. H. Immergut, 3rd edition, John Wiley & Sons, New York, 1989, "Encyclopedia of Chemical Technology", Kirk-Othmer, 3rd Edition, John Wiley & Sons, New York, and "Handbook of Plastics Materials and Technology", editor Irvin I. Rubin, John Wiley & Sons, New York, 1990, the contents of which are incorporated herein by cross reference.

Other plastic additives such as fillers, lubricants, reinforcements, coupling agents, plasticizers,, heat stabilizers and antioxidants may be used in the carbon-plastic electrodes of the invention. Examples of such additives are described in "Plastics Additives", E. W. Flick, Noyes Publications, Park Ridge, N.J. 1986; "Polymer Handbook", editors J. Brandrup and E. H. Immergut, 3rd edition, John Wiley & Sons, New York, 1989, "Compounding Materials for the Polymer Industries", J. S. Dick, Noyes Publications, Park Ridge, N.J. 1987, "Handbook of Plastics Materials and Technology", editor Irvin I. Rubin, John Wiley & Sons, New York, 1990, and "Chemical Additives for the Plastics Industry", Radian Corporation, Noyes Publications, Park Ridge, N.J. 1987, the contents of which are incorporated herein by cross reference.

Generally, the flexible, conducting plastic electrode material comprises:

| thermo-plastic polymer | 30 wt %–60 wt %; |
|---|---|
| elastomeric polymer cross-linked with thermoplastic polymer | 10 wt %–30 wt %; |
| conductive filler material | 5–50 wt %; and | graphite felt (heat and pressure fused onto at least one surface of the electrode) metal mesh/foil (heat and pressure fused onto a surface of the electrode).

In one preferred form the flexible, conducting plastic electrode material comprises:

| thermo-plastic polymer | 30 wt %–60 wt %; |
|---|---|
| elastomeric polymer cross-linked with thermoplastic polymer | 10 wt %–30 wt %; |
| conductive filler material | 5–40 wt %; |
| cross-linking agent | 1–10 wt %; and | graphite felt (heat and pressure fused onto at least one surface of the electrode) metal mesh/foil (heat and pressure fused onto a surface of the electrode).

In a particularly preferred embodiment, the flexible, conducting plastic electrode material is comprised of:

| HDPE | 30 wt %–60 wt % |
|---|---|
| SEBS block copolymer cross-linked with HDPE | 0.1 wt %–30 wt % |
| carbon black (fine powder, 13 nm) | 10 wt % |
| carbon black (coarse powder, >35 nm, typically 35 nm–10,000 nm) | 10 wt % |
| graphite fibre (3 mm in length) | 20 wt % |
| polymer initiator (used in preparation process) | 0.00–5 wt %, typically 0.1 wt %–2 wt % of the SBS copolymer |

In a second preferred embodiment of the invention the electrode comprises:

| HDPE | 20 wt % |
|---|---|
| SEBS block copolymer cross-linked with HDPE | 20 wt % |
| graphite fibre | 60 wt % |
| polymer initiator (used in preparation process) | 0.00 wt %–2 wt % of the SEBS copolymer |

Generally, the polyblend of thermo-plastic and elastomeric polymer is made by mixing the polymers in a suitable mixer at temperatures above the melting temperatures ($T_m$) of each constituent. More particularly, the polyblend of thermo-plastic and styrenic block copolymer is made by mixing the polymers in a suitable mixer at temperatures above the melting temperatures ($T_m$) of each constituent. Typically, the thermo-plastic, styrenic block copolymer and carbon black particles are blended in an internal mixer at 170°–225° C. for approximately 20 minutes. This mixture is preheated at 220° C. for 20 minutes then pressure-moulded at 220° C. and 200–250 Kg/cm$^2$ for approximately 30 minutes to form a thin flexible, conducting carbon-plastic sheet. The thin carbon-plastic sheet prepared by this method is characterised by more than 10% elongation and less than 0.3 ohm.cm in electrical resistivity. By heat-pressing a copper mesh on one side and heat-bonding a graphite felt on the other side, an end-electrode for a redox battery is completed. By heat-bonding a graphite felt on both sides, a bipolar electrode for a redox battery is completed.

The advantages of the electrode composite of the invention are its relatively low cost of manufacture, good electrical conductivity, physical strength, flexibility, low solution permeability when utilised in systems such as the vanadium redox flow battery and long chemical stability.

BRIEF DESCRIPTION OF THE DRAWINGS

The preferred embodiments of the invention are described in more detail with reference to the following drawings.

BEST MODE AND OTHER MODES FOR CARRYING OUT THE INVENTION

Figure 1:
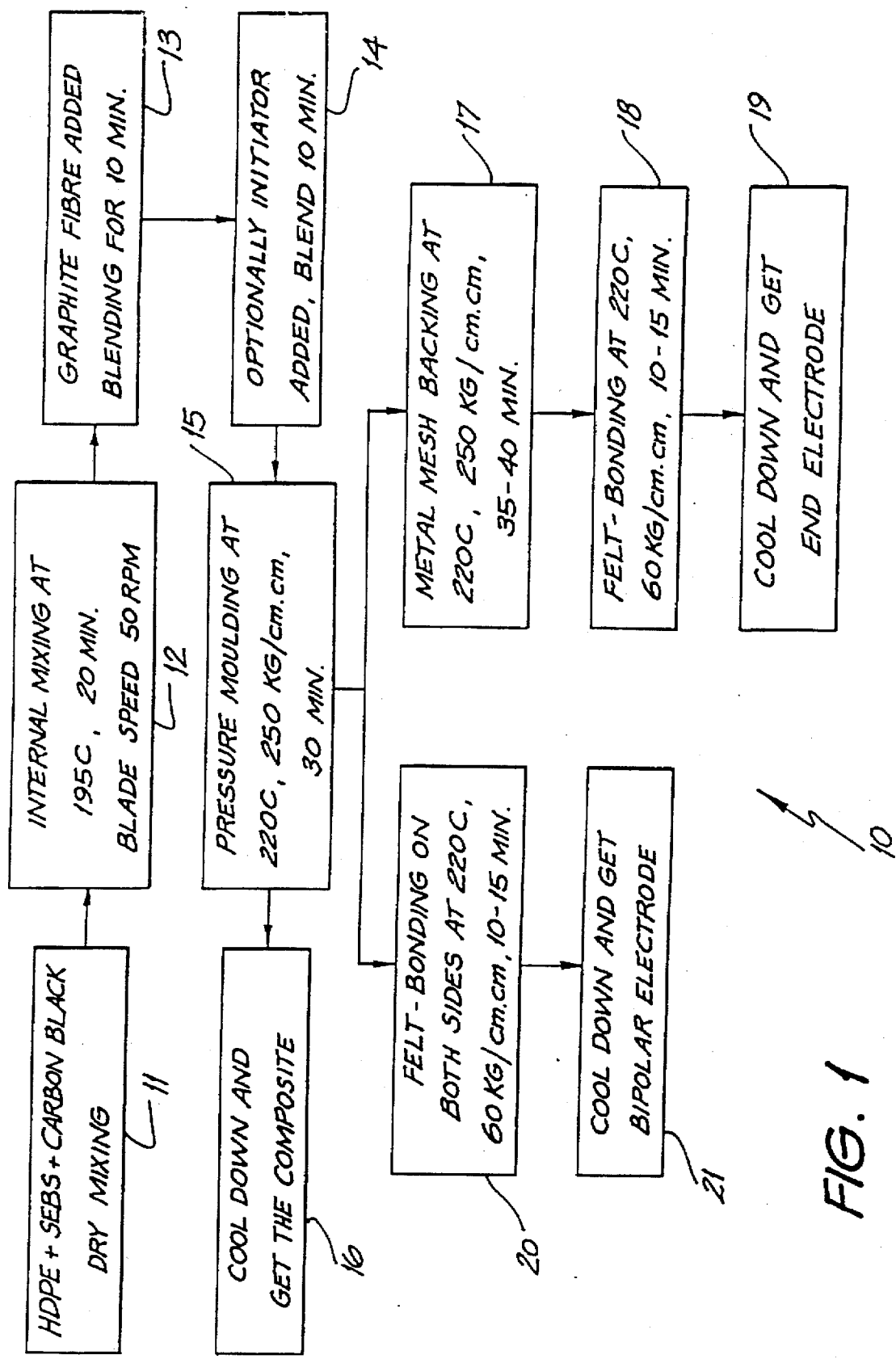
FIG. 1 is a flowchart illustrating the manufacturing process for the carbon-plastic, bipolar and end-electrode assemblies to be employed in a vanadium redox battery.

Referring to FIG. 1, a process for making a conducting plastic electrode, 10 comprises the initial step 11 of dry mixing high density polyethylene (20 wt %), styrene-butadiene-styrene (20 wt %) and carbon black (60 wt %). This mixture is then blended 12 at a blade speed of 50 rpm in an internal mixer at 195° C. for approximately twenty minutes. During the mixing in the internal mixer the mixture is not exposed to air. Graphite fibre is then slowly added to blended mixture 12 and blended 13 for approximately ten minutes. Polymerization initiator (0.00–0.15 wt % of SBS) is added to the blended mixture of 13 and blended 14 for a few minutes. The resulting mixture is pressure-moulded 15 at 250 Kg/cm$^2$ and 180°–220° C. for at least thirty minutes. The moulded material is cooled down rapidly 16 to get a thin, smooth, conductive and flexible carbon-plastic electrode sheet.

Referring to FIG. 1 and in particular steps 17, 18 and 19, an end-electrode is prepared by placing a metal mesh, preferably a copper or brass mesh, in the bottom of the mould. The carbon-plastic sheet is placed on top of the metal mesh and the mould is heated to approximately 220° C. The temperature is maintained for twenty minutes before applying a pressure of 250 Kg/cm$^2$ for fifteen minutes in step 17. A window is placed on the top of the hot carbon-plastic sheet and an electrochemically active layer, preferably a graphite felt layer, is placed in this window in step 18 and then a pressure of approximately 60 Kg/cm$^2$ is applied to the mould for approximately 10–15 minutes. The mould is then rapidly cooled in step 19 at 1°–10° C./min to obtain a flexible, conducting carbon-plastic and graphite felt end-electrode.

In steps 20 and 21, a bipolar electrode is prepared by placing a window (border about 0.5–8 cm, typically 5–8 cm, around electrode edges) on either side of the carbon-plastic sheet of 16 and then placing an electrochemically active layer, typically a graphite felt layer (typically 0.5–2.5 cm thick), into each of the two windows and placing this into a mold. A pressure of approximately 60 Kg/cm² is applied to the mould for 10–15 minutes at approximately 220° C. The mould is then rapidly cooled 21 to obtain a conducting carbon-plastic and graphite felt bipolar electrode.

Figure 2:
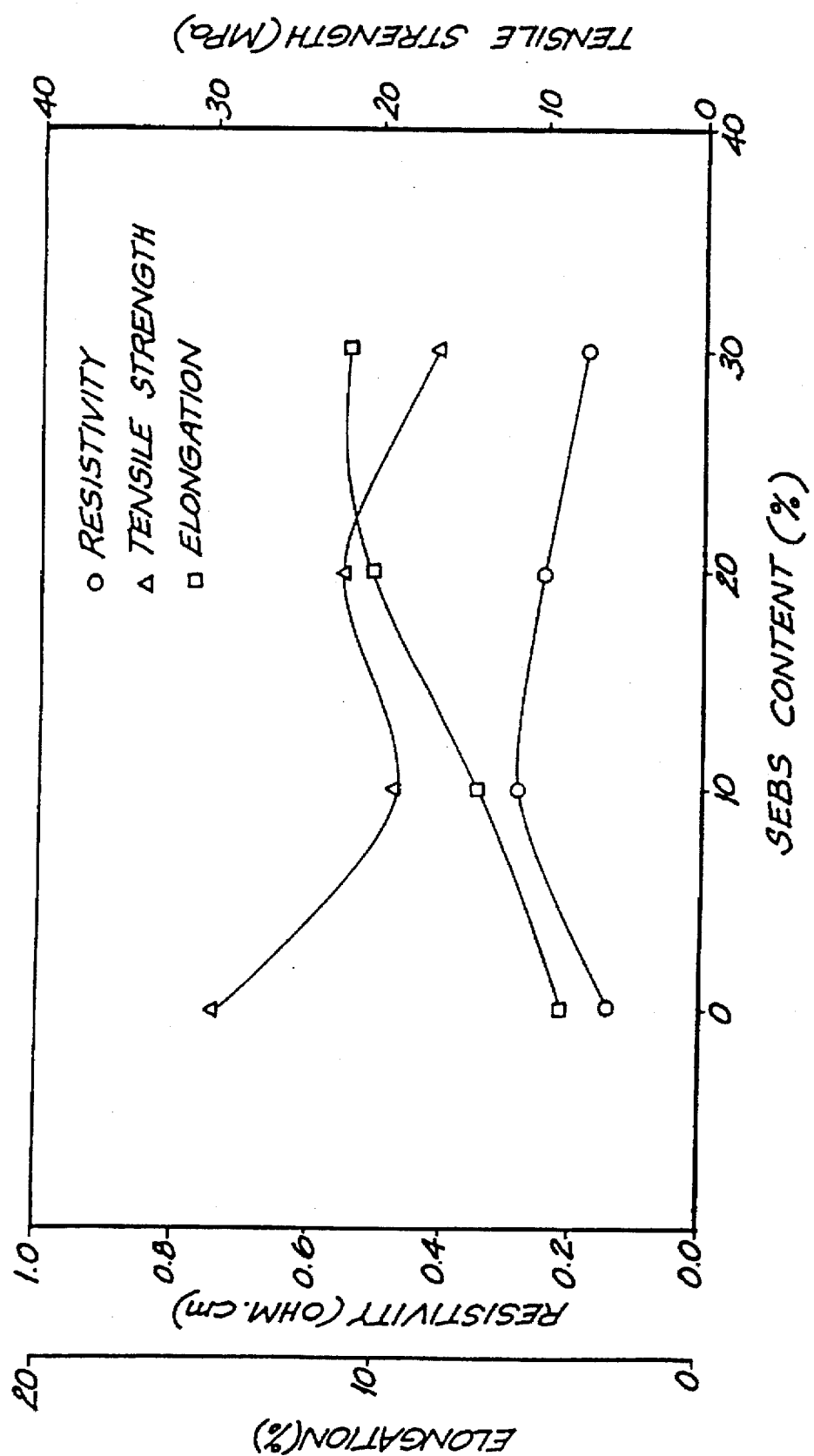
FIG. 2 is a graph indicating the electrical and mechanical properties of the carbon-plastic electrode materials.

FIG. 2 illustrates the influence which a styrenic block copolymer, styrene-ethene/butene-styrene (SEBS), has on the electrical and mechanical properties of the carbon-plastic material. The resistivity values of the different compositions of the SEBS block copolymer were determined by ASTM D-991. The mechanical properties of the different compositions of SEBS block copolymer were measured according to ASTM D-638. Referring to FIG. 2, the optimum composition of styrene-ethene/butene-styrene (SEBS) block copolymer with good electrical conductivity and good mechanical strength is around 20 wt %.

Figure 3:
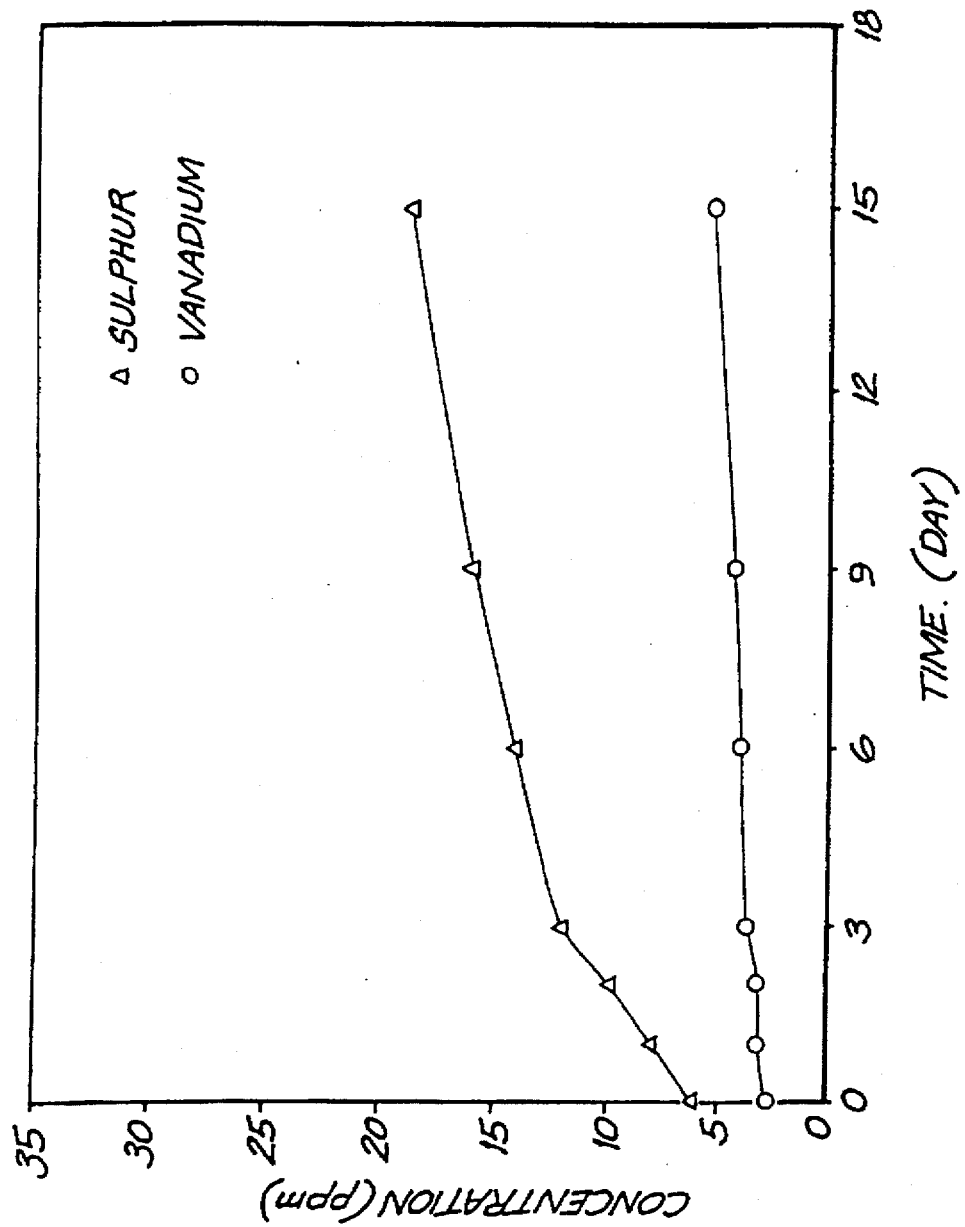
FIG. 3 is a graph showing the permeation behaviour of the carbon-plastic sheet in the electrolyte of the vanadium battery.

FIG. 3 illustrates a graph of the permeation test results of a conducting carbon-plastic sheet prepared according to the process of FIG. 1. The testing was carried out on a 0.3 mm thin sheet of carbon-plastic. The sheet was used as a separator of a round cell. The solution in one side of the separator was 2M $VOSO_4$ in 3M $H_2SO_4$. The other side contained distilled water. On both sides of the separator the respective solutions were continuously pumped through the cell and solution samples were taken periodically from the distilled water side. The samples were then tested with inductively coupled plasma (ICP) method to determine the concentrations of vanadium and sulphur which relate to the permeation rate of the ions through the sheet.

Figure 4:
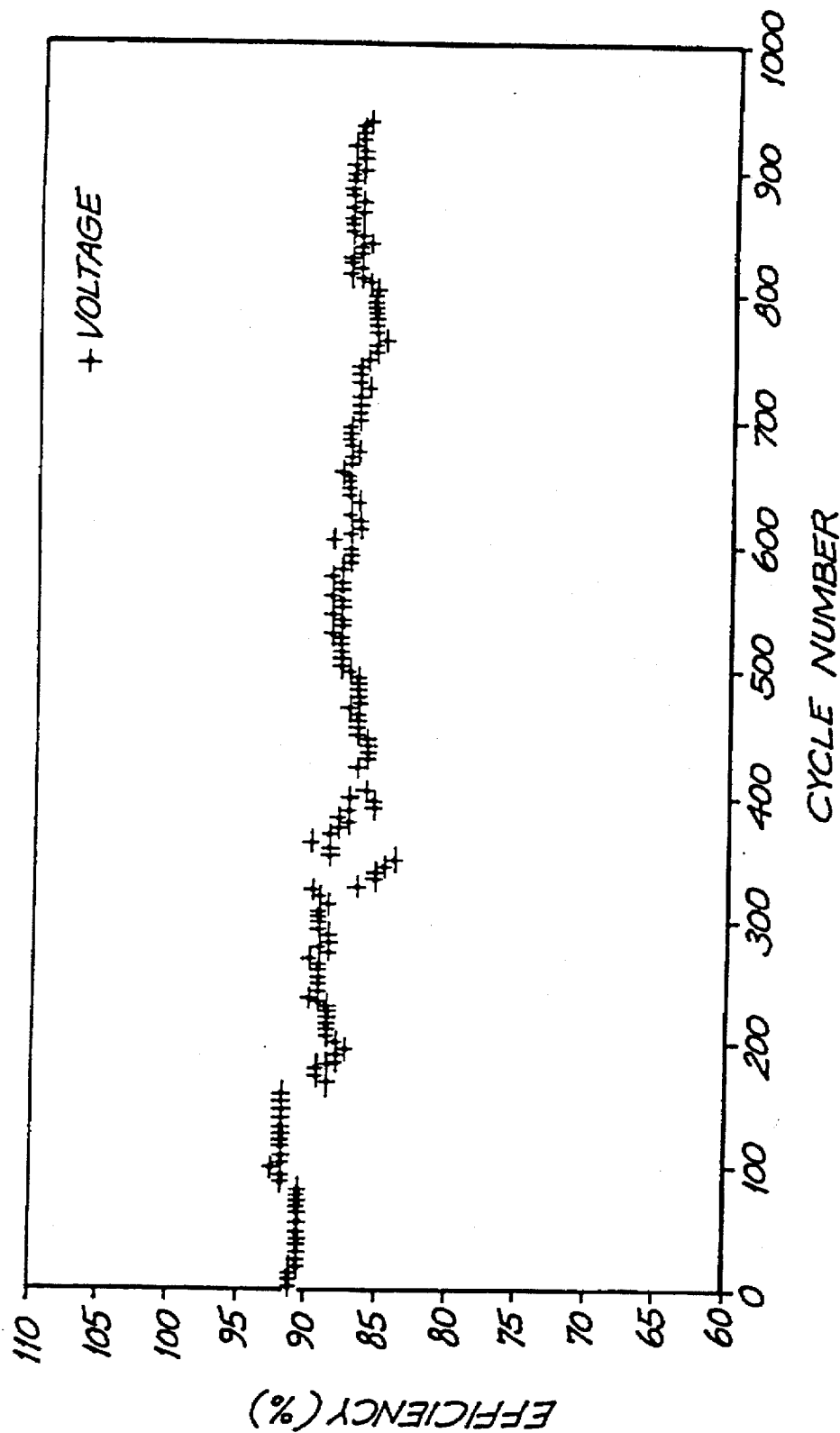
FIG. 4 is a graph showing the long-term stability of the electrode operating in the vanadium battery.

FIG. 4 is a graph of the long-term performance of a vanadium redox cell with two electrodes manufactured according to the invention as described above. The voltage efficiencies which relate to the activity and resistivity of the electrode, varied less than 5% over the operating period of 940 cycles of charging/discharging. The average time for one cycle is approximately four hours. Therefore, the total operating period was approximately 3760 hours. A drop of 5% efficiency over 3760 hours indicates that the electrode is substantially reactive and stable tbr the vanadium redox battery.

Figure 5:
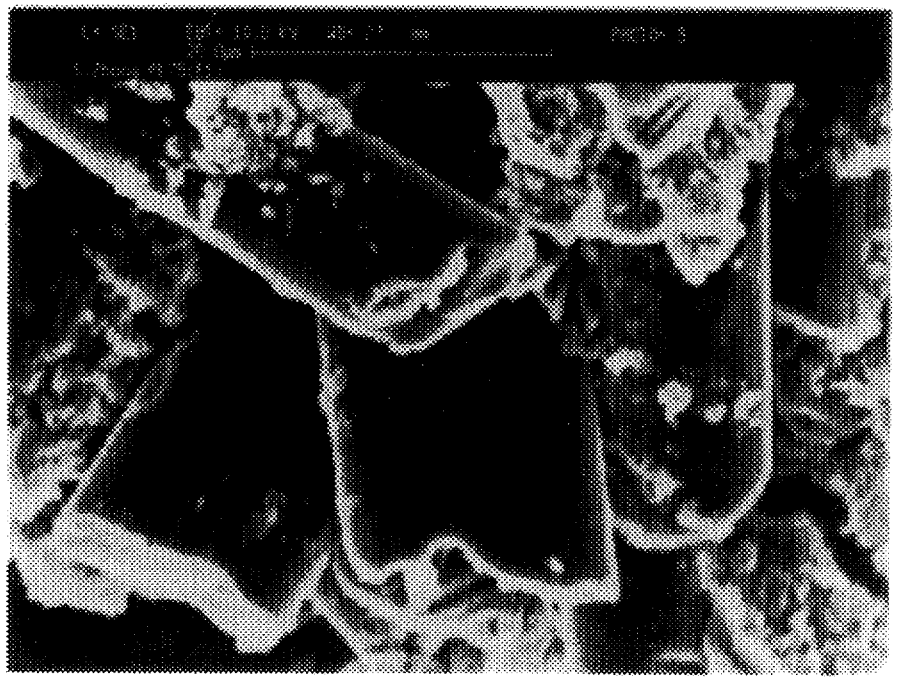
FIG. 5 is a microphotograph of a carbon-plastic surface which has been etched in a solution of 850 grams per litre $H_2SO_4$+30 grams $CrO_3$+60 grams $H_2O$ at 60° C. for 20 minutes so as to prepare it for subsequent activation by electrodepositing or chemically depositing an electroactive layer such as polypyrrole, polyaniline or a metal oxide.
Figure 6:
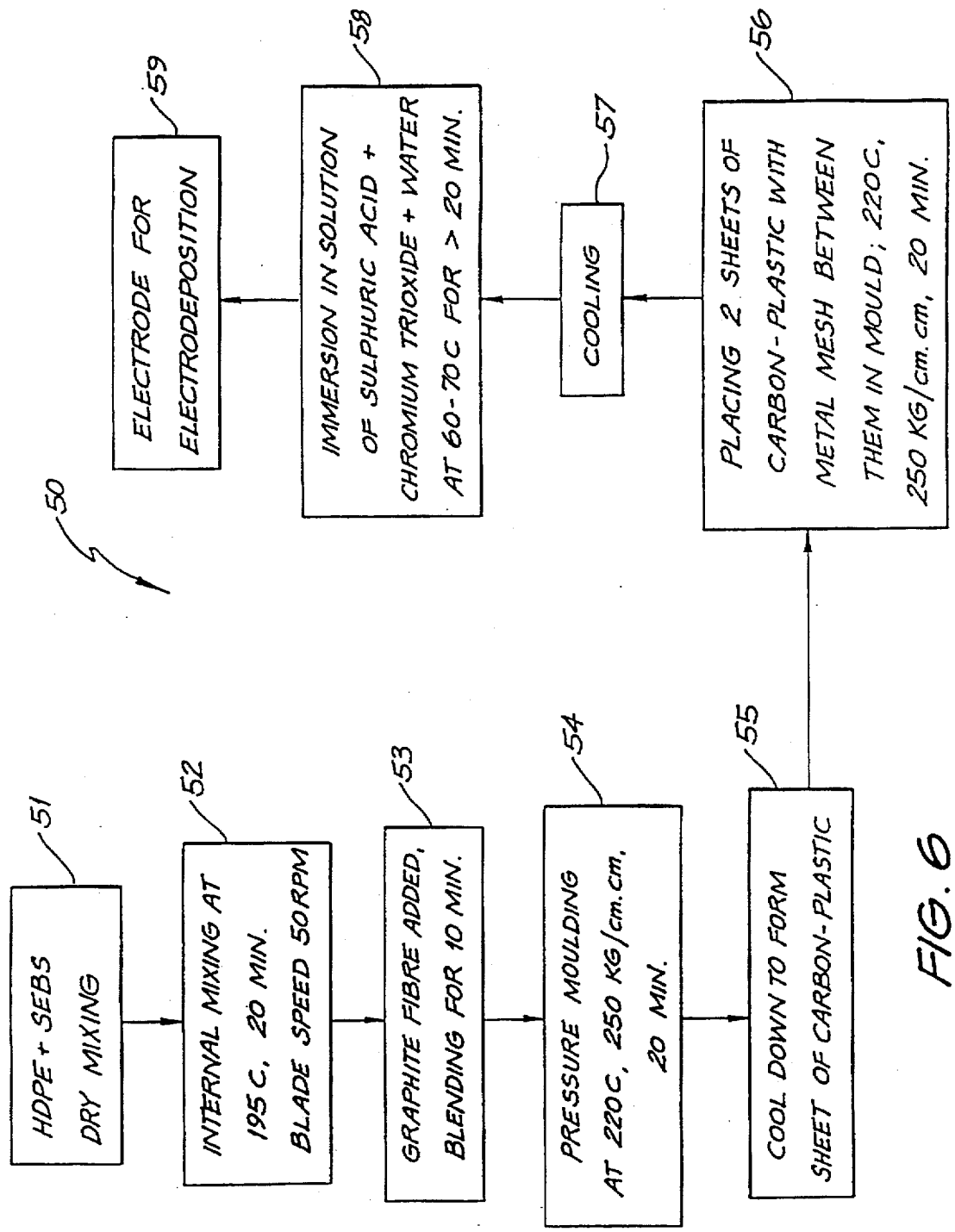
FIG. 6 is a flowchart illustrating the manufacturing process for carbon-plastic electrodes to be employed in electrodeposition of polypyrrole, polyaniline or metal oxides.

Referring to FIG. 5, a photograph of an electrode suitable for electrodeposition after it has been etched in a solution of $H_2SO_4$, $CrO_3$ and $H_2O$ is shown. The electrode is comprised of 20% high density polyethylene, 20 wt % SEBS, and 60 wt % graphite fibre and is prepared according to process 50 depicted in FIG. 6. Referring to FIG. 6 HDPE and SEBS are dry mixed 51 and blended 52 in a internal mixer at 195° C. for approximately 20 minutes at a blade speed of 50 rpm. Graphite fibre is slowly added in step 53 to the mixture of step 52 and blended for about 10 minutes. The mixture of step 53 is pressure moulded 54 at 250 Kg/cm² for 30 minutes at a temperature of 220° C. The mixture of step 54 is cooled down rapidly 55 to form a thin, conducting, smooth and flexible carbon-plastic sheet of carbon-plastic. A metal mesh is placed between two sheets of carbon plastic in step 56 and pressure molded at 250 Kg/cm² and 220° C. for 20 minutes. The mold is cooled in step 57 and immersed in a solution of 850–950 g/l $H_2SO_4$, 20–40 g/l $CrO_3$ (or $K_2Cr_2O_7$), 50–70 g/l $H_2O$ at 60°–70° C. for at least 20 minutes to form an electrode for electrodeposition of polypyrrole, polyaniline or metal oxides.

The following example is provided by way of illustration and is not intended to limit the invention in any way.

EXAMPLE 1

Twenty grams of high density polyethylene, sold under the trade name of GM 7665 by the Hostalen Chemical Comp., 10 grams of styrene-ethene/butene-styrene (SEBS) block copolymer, sold under the name of Kraton G1652 by Shell Chemical Australia Pty. Ltd., 5 grams fine carbon black, sold under the name of FW 200 and 5 grams coarse carbon black, sold under the name of XE-2 by Degussa Australia Pty. Ltd., 10 grams of graphite fibre, sold under the name of c-203s by Kureha Chemical Industry Co., Ltd. and 0.1 grams of dicumyl peroxide were blended inside an internal mixer at 195° C. for 20 minutes. The mixture was placed into a compression mould and moulded into 21×21 cm² plate under 250 Kg/cm² pressure at 220° C. for 30 minutes. The mould was rapidly cooled down to room temperature. The formed sheet had a compressed thickness of 0.7 mm, an electrical resistivity of 0.24 ohm.cm, tensile strength of 21.8 N/mm² and elongation of 10.1%. The end-electrodes were fabricated by placing an equal sized brass mesh under the carbon-plastic sheet in the mould, heating up the mould to 220° C. and applying a pressure of 250 Kg/cm² for 10 minutes. The cover of the mould was then replaced by a rectangular shaped window, and a piece of graphite felt sized 12×11.5 cm² was put into the window of the same dimensions. A 60 Kg/cm² pressure was applied to the mould for 10 minutes at 220° C. The mould was rapidly cooled to obtain an end-electrode for a redox electrolysis cell. The formed end-electrode had electrical resistance of 0.7 ohm.cm². Two of these end-electrodes have been used in the vanadium battery for more than 3760 hours with recorded voltage efficiencies of approximately 88%.

ADDITIONAL EXAMPLES

Conductive graphite fibre have been used successfully to increase the electrical conductivity of carbon-polyethylene composite materials as electrode matrix layer. However, their incorporation results in an increasing melt viscosity and difficult processing. The fabrication of extrudable conductive electrodes requires to reduce graphite fibre content, on the other hand, this can result in a higher resistant material. The purpose of this work was to find materials and compound with the highest conductivity, chemical resistant, flexibility and extrudability.

1. Electrical Conductivity of High Density Polyethylene (HDPE)

1.1 Comparison of HDPE Types

To increase the processability of the compounds, two higher melt flow index HDPE were used. From Table 1 it can be said that the new HDPE materials have better melt flow index and conductivity.

| Materials | Weight % |
| --- | --- |
| HDPE | 40% |
| SEBS* Rubber | 20% |
| Carbon Black | 20% |
| Graphite Fibre | 20% |

*Styrene-Ethene-Butene-Styrene Rubber

TABLE 1

Comparison of HDPE types.

| HDPE TYPE | MFI (190/2) | MFI (190/5) | Sample 1 volume resistivity | Sample 2 volume resistivity | Average Resistivity (Ω · cm) | Physical Property | Result |
|---|---|---|---|---|---|---|---|
| GM 7655 | 0.2 | 0.6 | 0.240 | 0.240 | 0.240 | Good | Very low MFI |
| GD 7255 | 3.5 | 12 | 0.260 | 0.219 | 0.239 | Flexible | Good |
| GC 7260 | 7.0 | 23 | 0.316 | 0.271 | 0.293 | Flexible | This is the best one (low resistivity and highest MFI) |

1.2 The Effects of Rubbers

To study the effect of rubber electrical resistivity and also to decrease the resistivity of the composite, four kinds of rubber with different resistivities were used.

| Materials | Weight % |
|---|---|
| HDPE (GM 7655) | 40% |
| Rubber | 20% |
| Carbon Black | 20% |
| Graphite Fibre | 20% |

| Materials | Weight % |
|---|---|
| HDPE (GC 7260) | 40% |
| Rubber | 20% |
| Carbon Black | 20% |
| Graphite Fibre | 20% | good properties. However, to optimise the types and amount of carbon black, this part of experiments needs more materials, information and work.

TABLE 2

The effects of various rubbers upon composite conductivity

| Rubber | Electrical Resistivity of Rubber | Sample 1 volume resistivity | Sample 2 volume resistivity | Average Resistivity (Ω · cm) | Physical Property | Result |
|---|---|---|---|---|---|---|
| NBR* | Low | 0.242 | 0.384 | 0.313 | Rigid-Tough | Good restivity and good physical properties but need more tests |
| Santoprene | High | 3.741 | 3.179 | 3.460 | Cracked | (High resistivity and weak properties) |
| EPDM** (2504) | High | 5.027 | 2.955 | 3.991 | semi-flexible | (High resistivity) |
| EPDM (2504) | High | 0.219 | 0.512 | 0.366 | Tough-flexible with uniform surface | Good material (it can be improved) |

*.Acrylonitrile-Butadiene Rubber
**.Ethylene-Propylene-Diene Rubber

As is shown in Table 2, the best rubber after SEBS are NBR and EPDM (Vistalon 2504). Although the resistivity of NBR is lower than EPDM but after mixing with other components, EPDM (Vistalon 2504) showed better general properties.

1.3 The effects of Different Grades of Carbon Black

As a result of the comparing of the HDPE grades, HDPE (GC 7260) was chosen and then different types of carbon black were mixed to find the best properties. It was observed that Vulcan XC 72 and 72R were the best materials with

TABLE 3

The effects of different grades of Carbon Black

| Carbon Black Type | Sample 1 volume resistivity | Sample 2 volume resistivity | Average Resistivity | Physical Property | Description |
|---|---|---|---|---|---|
| Degussa (10% XE,2 + 10% FW,200) | 0.240 | 0.240 | 0.240 | Good | Good |
| ACARB P | 0.278 | 0.467 | 0.372 | Cracked (Brittle) | Less than optimum |
| Vulcan XC72 | 0.298 | 0.267 | 0.282 | Flexible with uniform surface | Suitable material with lowest resistivity |
| Vulcan XC 72R | 0.408 | 0.351 | 0.378 | Better flexibility and surface uniformity | Because of insufficient material, w/w was 15% |

2. Electrical Conductivity of Polypropylene (PP)

2.1 Homopolymer of PP

For easier processing, high melt flow index (MFI=40) Propathene LZM60CR (homopolymer) was used. Meanwhile, to compare with the other results, instead of Vulcan carbon black, Degussa mixed carbon black (XE2+ FW200) and graphite fibre were added.

| Materials | Weight % |
|---|---|
| PP | 40% |
| Rubber | 20% |
| Carbon Black | 20% |
| Graphite Fibre | 20% |

TABLE 4

The effects of different rubbers on the physical properties of carbon-pp composite

| Rubber Type | Sample 1 volume resistivity | Sample 2 volume resistivity | Average resistivity ($\Omega \cdot$ cm) | Physical Property | Description |
|---|---|---|---|---|---|
| NBR | 0.983 | 0.753 | 0.859 | Cracked (brittle) | Unsuitable |
| SEBS | 0.415 | 0.512 | 0.464 | Flexible | One of the best samples with semi-tough property, but needs more test to reduce resistivity and also replacing of SEBS with EPDM may be resulted to better properties |

2.1 Copolymer of PP

To study the roll of a PP-copolymer, Propathene LZM197CR - MFI=40 was used in the same conditions.

| Materials | Weight % |
|---|---|
| CO-PP | 40% |
| Rubber | 20% |
| Carbon Black | 20% |
| Graphite Fibre | 20% |

TABLE 5

The effects of different rubbers on the physical properties of carbon-copolymer composite.

| Rubber Type | Sample 1 volume resistivity | Sample 2 volume resistivity | Average resistivity ($\Omega \cdot$ cm) | Physical Property | Description |
|---|---|---|---|---|---|
| NBR | 0.751 | — | 0.751 | Cracked (brittle) | Unsuitable |
| SEBS | 0.218 | 0.136 | 0.177 | brittle, with some small cracks on one side | Although the physical properties are weak but very low resistance cause making and testing more samples |

1. Electrical Conductivity of Poly Vinylchloride (PVC)

Generally, vinyls will withstand continuous exposure to temperature ranging up to 130° F.; flexible types, filaments, and some rigid are unaffected even by higher temperature up to 200° F. One of the basic advantages is the way it accepts compounding ingredients. For instance, PVC can be plasticised with a variety of plasticiser to produce soft, yielding materials to almost any desired degree of flexibility. PVC raw materials are available as resin, latexes organosols, plastisols, and compounds.

PVC is extremely resistant to inorganic acids such as hydrochloridric, nitric, phosphoric, and concentrated sulfuric acids. The fatty acids, stearic, oleic, and lionelic, have little effect upon PVC at ambient temperatures. Rigid PVC is extremely resist to oxidising agents such as strong sulfuric, nitric, chromic acids, hydrogen peroxide, and sodium hypochlorite. The common solvents such as ketones, esters, ethers, chlorinated hydrocarbons, and aromatic hydrocarbons soften and in some instances dissolve rigid PVC. Alcohols and aliphatic hydrocarbons have little effect upon PVC. It is completely resistant to all common animal, mineral, and vegetable oils. (Haper. C. A., handbook of plastics and elastomers, McGraw-Hill Book Co. 1975).

TABLE 6

Comparison of HDPE and PVC properties:

| Property | HDPE (rigid) (low plasticiser content) | PVC (high plasticiser content) |
|---|---|---|
| | Excellent electrical (insulation) Properties, Low electrical losses. Tough and chemically resistant, but weak to varying degree in creep and thermal resistance. Their thermal stability generally increase with density class. | Good low-cost, general purpose thermoplastic material, but poor electrical (resistivity) properties. Greatly influenced by plasticisers. Many varieties available, including flexible and rigid types. Flexible PVC widely used for wire insulation and |

TABLE 6-continued

Comparison of HDPE and PVC properties:

| Property | HDPE (rigid) | PVC (low plasticiser content) | | PVC (high plasticiser content) |
|---|---|---|---|---|
| Common available form | Blow moulding, extrusions, injection moulding thermoformed parts, stock shapes, film, fibre foams. | jacketing. Extrusion, blow moulding, injection moulding, rotational moulding, film sheet, compression moulding, vacuum forming casting. | | |
| Volume resistivity ASTM D257 Ohm.cm ASTM D257 | $6 \times 10^{15}$–$10^{18}$ | $10^{12}$–$10^{16}$ | $10^{14}$–$10^{15}$ | $10^{11}$–$10^{13}$ |
| Dielectric strength Volt/mil ASTM D149 | >800 | 400–500 | >400 | >300 |
| Dielectric constant $10^3$ c/s ASTM D150 | 2.25–2.35 | 3–3.2 | 4–5 | 5–6 |
| Power Factor $10^3$ c/s ASTM D150 | <0.0005 | <0.02 | <0.1 | <0.1 |
| S.g | 0.941 | 1.38 | 1.36 | 1.35 |
| Chemical resistance (sulfuric acid 78%, 75° F. | excellent | excellent | good | fair |
| Chemical resistance (sulfuric acid 93%, 75° F.) | excellent | excellent | fair | weak |
| Tensile strength (psix $10^4$) ASTM D638,651 | 0.31–0.55 | 0.75–0.85 | 0.4–0.6 | 0.2–0.4 |
| Young's modulus (psix $10^5$) ASTM D747 | 0.8–1.5 | 3.0–4.0 | 5.0–7.0 | |
| Elongation at break % ASTM D638 | 50–800 | 2–40 | 200–25– | 350–450 |
| Flexural strength (psix $10^4$) ASTM D790 | 0.2–0.3 | 1.35 | 1.20 | |
| Compressive strength (psix $10^4$) ASTM D697 | 0.2–0.3 | 0.75–0.85 | 1.1–1.4 | |
| Hardness (Rockwell) ASTM D785 | D60-70 (Shore) | R110 | R1051 | D76-80 (Shore) |
| Heat distortion (°F.) | 144–190 | 165 | | 155 |
| Impact strength ft lb/in notch Izod ASTM D256 | 1.5–12 | 1–3 | 12–17 | |
| Continues heat resistance (°F.) | 250 | 150 | | 140 |
| Flammability | very slow burning | self-extinguishing | | very slow burning |
| Water absorption | <0.01 | 0.07–0.40 | | 0.15–0.75 |
| Softening point (Vicat) °C. ASTM D1525 | 120–130 | 80–90 | | 70–80 |
| Resistance to solvents ASTM D543 | unaffected below 80° C. | | | swell in aromatic hydrocarbons, soluble in ketones and esters. |

Due to very difficult processing of pure PVC, Experimental 7102 01 (ICI) was used.

Due to very difficult processing of pure PVC, Experimental 7102 01 (ICI) was used.

| Materials | Weight % |
|---|---|
| PVC | 40% |
| Rubber | 20% |
| Carbon Black | 20% |
| Graphite Fibre | 20% |

TABLE 7

The effects of different rubbers on the physical properties of carbon-PVC composite.

| Rubber Type | Sample 1 volume resistivity | Sample 2 volume resistivity | Average resistivity ($\Omega \cdot$ cm) | Physical Property | Description |
|---|---|---|---|---|---|
| NBR | 0.486 | 0.626 | 0.556 | It seems tough | It needs more test |
| SEBS | 0.212 | 0.800 | 0.508 | Brittle, but without cracks | It seems that polymer could not mix with graphite fibre very well. So it may be because of unsuitable mixing and then moulding temperature or polarity of one of the components. However it needs more testing. |

Preferred Materials

1. Carbon Black

| | |
|---|---|
| 1. Degussa FW 200 | |
| 2. Degussa Printex × E | |
| 3. Vulcan 72 × C   s | (Cabot) |
| 4. Vulcan 72 × CR | (Cabot) |
| 5. ACARBP | (Cabot) |
| 6. Black Pearl 2000 | (Cabot) |
| 7. Activated Cole | |
| 8. Activated Carbon | (Merck) |

2. Graphite Powder

1. Lonza
2. Thai Gypsum
3. Plasticizer and Lubricant

| 1. Wax op | (Hoechst) |
| 2. Wax Pe520 | (Hoechst) |
| 3. GMS Loxiol G12 | (IEI) |
| 4. Loxiol G15 | (IEI) |

4. Rubber

| 1. NBR | | (Vistalon) |
| 2. EPR | 404 | (Vistalon) |
| 3. EPR | 504 | (Vistalon) |
| 4. EPR | 805 | (Vistalon) |
| 5. EPR | 808 | (Vistalon) |
| 6. EPDM | 2504 | (Vistalon) |
| 7. EPDM | 3708 | (Vistalon) |
| 8. EPDM | 7000 | (Vistalon) |
| 9. EPDM Santoprene | | |
| 10. SBS | K1162 | (Shell-Keraton) |
| 11. SEBS | K1652 | (Shell-Keraton) |
| 12. SBS | Aldrich | |
| 13. EPR | VM42 | |
| 14. Isobutylene/CO/PE BM × 42 | | |
| 15. Butyl | | |

5. Plastics

| 1. prc (raw material) | | (ICI) |
| 2. prc dry blend | | (ICI) |
| 3. nylon u | | (ICI) |
| 4. nylon 6 | | (ICI) |
| 5. Epalex - Polyproplyene/carbon black (Poly Pacific) | | |
| 6. LDPE | 21624 | (Hoechst) |
| 7. LDPE | 1711200 | (Hoechst) |
| 8. HDPE | 7260 | (Hoechst) |
| 9. HDPE | 7655 | (Hoechst) |
| 10. HDPE | 7260 H | (Hoechst) |
| 11. HDPE | 7255 | (Hoescht) |
| 12. PPW - Polypropylene - W | | (Hoechst) |
| 13. PPT - Polypropylene - T | | (Hoechst) |
| 14. PP12m60CR | | (Hoechst) |
| 15. PP Copolymer (L2m 197CR) | | (Hoechst) |

ICI - pp (Polypropylene) Unit

FURTHER EXAMPLE

Preparation Procedure of Conductive Carbon Polymer Composite 350 grams of granulated composite:
Typical Formulation

| 1. HDPE: TPI TYPE G-2855 | 40 wt % |
| 2. Carbon Fiber: Besfight type HTA - C6-S | 20 wt % |
| 3. Graphite powder: from graphite electrode grinding | 20 wt % |
| 4. SEBS: Shell G-1652 | 20 wt % | is spread onto a 0.75×420×620 mm mould and then the mould is covered on. The mould is placed onto a hydraulic-hot-press and, under no pressure, it is heated up to 170° C. for 30 minutes, then the pressure is slowly increased up to 45 tons for another 30 minutes, then the moulded composite material is cooled down to room temperature (2 hours) to obtain the thin, smooth and flexible carbon-polymer sheet.

To prepare an end-electrode, a metal mesh (such as copper) is placed in the bottom of the mould. The carbon-plastic sheet is placed on top and the mould heated up to 170° C. The temperature is maintained for 30 minutes before applying the same pressure of 45 tons for 60 minutes. While keeping the hot carbon-plastic sheet with the metal mesh backing in mould, a 300×500 mm window is placed on the top of the hot sheet and a graphite felt is placed in the window. A pressure of a 2 tons is then applied to the mould with the window, and this is maintained for 30 minutes. The mould is then cooled down to room temperature to obtain the carbon-plastic and graphite felt composite end-electrode.

To manufacture a bipolar electrode, two windows, are required. Placing the two windows on both sides of the prepared composite carbon-plastic sheet, two pieces of electrochemically active layers (graphite felt) are placed into the two windows. By following the same procedure of bonding felt for the end-electrode, a bipolar electrode can be obtained.

INDUSTRIAL APPLICABILITY

The electrodes of the invention may be further processed to produce bipolar electrodes and end-electrodes. An electrode of the invention may be can be utilized in vanadium redox cells and in electrodepositing of polypyrrole, polyaniline or metal oxides.

We claim:

1. A flexible, conducting plastic substrate material for a conducting electrode, said plastic substrate material comprising:

(a) a conductive filler material;

(b) a thermo-plastic polymer; and (c) an elastomeric polymer at least partially cross-linked with (b);

wherein (a) is present in an amount such that the plastic substrate material is electrically conducting and (b) is cross-linked with (c) to a degree such that the plastic substrate material is flexible and has high tensile strength.

2. An electrode comprising the plastic substrate material of claim 1 and;

a further electrode component selected from the group consisting of a metal mesh, a metal sheet, a metal foil, and graphite felt, wherein the further electrode component is pressure and heat welded to the plastic substrate material in a configuration selected from a group consisting of a layer of the plastic substrate material and a layer of the further electrode component, a layer of metal foil between two layers of the plastic substrate material, and a layer of metal mesh between two layers of the plastic substrate material.

3. The electrode of claim 2 wherein the plastic substrate material comprises:

the thermo-plastic polymer in an amount of 30 wt %–60 wt %;

the elastomeric polymer cross-linked with thermoplastic polymer in an amount of 10 wt %–30 wt %; and the conductive filler material in an amount of 5–40 wt %;

and the further electrode component is a layer of graphite felt heat and pressure fused onto at least one surface of the plastic substrate material.

4. The plastic substrate material of claim 1 wherein the conductive filler material is selected from the group consisting of carbon black, graphite powder, metal powder, metallized glass fibers, pitch-derived carbon fibers, graphite fibers, polyacrylonitrile-derived carbon fibers and polyacrylonitrile-derived graphite fibers.

5. The plastic substrate material of claim 4 wherein the conductive filler material comprises carbon black in an amount of 10–70 wt % of the total composition.

6. The plastic substrate material of claim 4 wherein the conductive filler material comprises a mixture of carbon black and graphite fibers in a weight ratio in the range 5:95 to 95:5 in an amount of 10–70 wt % of the total composition.

7. The plastic substrate material of claim 6 wherein the carbon black to graphite fibers is in a weight ratio of 50:50.

8. The plastic substrate material of any one claims 4 to 7 wherein at least two different types of carbon black are used, namely, fine carbon black powder (2–35 nm) and coarse carbon black powder (35 nm–10,000 nm) in a weight ratio of fine carbon:coarse carbon of from 1:99 to 99:1.

9. The plastic substrate material of claim 4 wherein the weight ratio of carbon black plus graphite fibers content to total polymer is 2:3.

10. The plastic substrate material of claim 1 wherein the thermo-plastic polymer is 10–80 wt % of the total composition.

11. The plastic substrate material of claim 1 wherein the thermo-plastic polymer is selected from the group consisting of low density polyethylene, high density polyethylene,, polypropylene, polybutylene and polystyrene.

12. The plastic substrate material of claim 1 wherein the elastomeric polymer includes at least one or more polymers selected from the group consisting of styrene-isoprene-styrene, nitrile rubber (NBR), ethylene-propylene-diene terpolymer (EPDM), ethylene-propylene copolymer (EP), styrene-butadiene (SB), ethylene-propylene rubber (EPR), n-butyl rubber, styrene-butadiene-styrene, santoprene, and styrene-(ethylene-butylene)-styrene.

13. The plastic substrate material of claim 1 or 11 wherein the elastomeric polymer is from 1–50 wt % of the total composition.

14. A process for making a plastic substrate material for a conducting electrode, the process comprising;
  (a) mixing a thermo-plastic polymer, an elastomeric polymer and conductive filler material, the mixing being at a temperature(s) above the melting point temperatures of the thermo-plastic polymer and the elastomeric polymer,
  (b) extruding or pressure moulding the mixture of (a) at a temperature(s) above the melting temperatures of the thermo-plastic polymer and the elastomeric polymer until the polymers are at least partially cross-linked wherein the degree of cross-linking of the thermo-plastic with the elastomeric polymer is such that the plastic substrate material is flexible and has high tensile strength, and
  (c) cooling the cross-linked polymerized mixture of (b) to form the plastic substrate material; wherein an amount of the conductive filler material is such that the plastic substrate material is electrically conducting.

15. The process of claim 14 wherein in step (c) the polymerized mixture of (b) is cooled rapidly.

16. The process of claim 14 further comprising
  (b)(i) adding a polymerization initiator to the mixture of (a), and
  (b)(ii) optionally adding at least one chemical additive to the mixture of (a).

17. The process of any one claims 14 to 16 further including the step of pressure and heat welding a further electrode component selected from the group consisting of a metal mesh, metal sheet, a metal foil and a graphite felt onto at least one surface of the flexible, conducting plastic substrate material.

18. The process of any one of claims 14 to 16 wherein the conductive filler material is selected from the group consisting of carbon black, graphite powder, metallized glass fibers, pitch-derived carbon fibers, graphite fibers, polyacrylonitrile-derived carbon fibers and polyacrylonitrile-derived graphite fibers.

19. The process of any one of claims 14 or 16 wherein the filler material is comprised of a mixture of carbon black and graphite fibres in a range of 10–70 wt % of the total composition.

20. The process of any one of claims 14 or 16 wherein the elevated pressure is in the range from 25–2500 Kg/cm$^2$.

21. The process of any one of claims 14 or 16 wherein during the elevated pressure step the temperature is in the range 150°–750° C.

22. A flexible, conducting plastic substrate material for a conducting prepared by the process of claim 14.

23. A flexible, conducting plastic substrate material for a conducting electrode comprising:
  (a) a conductive filler material;
  (b) a thermo-plastic polymer; and
  (c) an elastomeric polymer;
wherein (a) is present in an amount such that the plastic substrate material is electrically conducting and (a), (b), and (c) are each in an amount in a ratio of (a):(b):(c) such that the substrate material is flexible and has high tensile strength.

24. An all-vanadium redox battery having a positive compartment containing a catholyte in electrical contact with a positive electrode, the catholyte comprising an electrolyte containing tetravalent vanadium ions or pentavalenet vanadium ions, a negative compartment containing an anolyte in electrical contact with a negative electrode, the anolyte comprising an electrolyte containing tetravalent vanadium ions, trivalent vanadium ions or divalent vanadium ions, and an ionic conducting separator disposed between the positive and negative compartments and in contact with the catholyte and anolyte to provide ionic communication therebetween and wherein the catholyte includes a salt of the formula (VO(X)$_y$ where when y is 2 then X is selected from the group consisting of F, Br and Cl and when y is 1 then X is selected from the group consisting of SO$_4$, or O, V$_2$O$_5$, V$_2$O$_3$, V$_2$O$_4$, VO, VSO$_4$, VOSO$_4$, V$_2$(SO$_4$)$_3$, (VO$_2$)$_2$SO$_4$), and NH$_4$VO$_3$, and a concentration of the salt is 0.1M to 5.0M, and wherein at least one of the positive and negative electrodes comprises a plastic substrate material of claim 1 or 22 or 23.

25. A conducting electrode comprising the plastic substrate material of claim 23; and
  a further electrode component selected from the group consisting of a metal mesh, a metal sheet, a metal foil, and graphite felt, and wherein the further electrode component is pressure and heat welded to the plastic substrate material in a configuration selected from the group consisting of a layer of the further electrode component and a layer of the plastic substrate material, a layer of metal foil between two layers of the plastic substrate material, and a layer of metal mesh between two layers of the plastic substrate material.

26. The plastic substrate material of claim 23 wherein the conductive filler material is selected from the group consisting of carbon black, graphite, metal powder, metallized glass fibres, pitch-derived carbon fibres, graphite fibres, polyacrylonitrile-derived carbon fibres and polyacrylonitrile-derived graphite fibres.

27. The plastic substrate material of claim 26 wherein the conductive filler material comprises carbon black in an amount of 10–70 wt % of the total composition.

28. The plastic substrate material of claim 26 wherein the conductive filler material comprises a mixture of carbon black and graphite fibres in a weight in the range of 5:95 to 95:5 in an amount of 10–70 wt % of the total composition.

29. The plastic substrate material of claim 28 wherein the black to graphite fibres is in a weight ratio of 50:50.

30. The plastic substrate material of any one of claims 26 to 29 wherein at least two different types of carbon black are used, namely, fine carbon black powder (2–35 nm) and coarse carbon black powder (35 nm–10,000 nm) in a weight ratio of fine carbon:coarse carbon of from 1:99 to 99:1.

31. The plastic substrate material of claim 26 wherein the electrode has a weight ratio of carbon black plus graphite fibres content to total polymer of 2:3.

32. The plastic substrate material of claim 23 wherein the thermo-plastic polymer is 10–80 wt % of the total composition.

33. The plastic substrate material of claim 23 wherein the thermo-plastic polymer is selected from the group consisting of low density polyethylene, high density polyethylene, polypropylene, polybutylene and polystyrene.

34. The plastic substrate material of claim 23 wherein the elastomeric polymer includes at least one or more polymers selected from the group consisting of styrene-isoprene-styrene, nitrile rubber (NBR), ethylene-propylene-diene terpolymer (EPDM), ethylene-propylene copolymer EP, styrene-butadiene (SB), ethylene-propylene rubber (EPR), n-butyl rubber, styrene-butadiene-styrene, santoprene, and styrene-(ethylene-butylene)-styrene.

35. The plastic substrate material of claim 23 or 34 wherein the elastomeric polymer is from 1–50 wt % of the total composition.

36. A process for making a flexible, conducting plastic substrate material for a conducting electrode, the process comprising:

(a) mixing a thermo-plastic polymer, an elastomeric polymer and conductive filler material, the mixing being at a temperature(s) above the melting point temperatures of the thermo-plastic polymer and the elastomeric polymer, (b) extruding or pressure moulding the mixture of (a) at a temperature above the melting temperatures of the thermo-plastic polymer and the elastomeric polymer, and (c) cooling the cross-linked polymerized mixture of (b) to form the substrate material;

wherein the conductive filler material is present in an amount such that the substrate material is electrically conducting and the thermo-plastic polymer, elastomeric polymer and conductive filler material are each in an amount such that the substrate material is flexible and has high tensile strength.

37. The process of claim 36 wherein in step (c) the polymerized mixture of (b) is cooled rapidly.

38. The process of claim 36 or claim 37 further including the step of pressure and heat welding at least one electrode material selected from the group consisting of a metal mesh, a meal sheet, a metal foil and a graphite felt onto at least one surface of the plastic substrate material.

39. The process of claim 36 or claim 37 wherein the conductive filler comprises one or more materials selected from the group consisting of carbon black, graphite powder, metal powder, metallized glass fibres, pitch-derived carbon fibres, graphite fibres, polyacrylonitrile-derived carbon fibres and polyacrylonitrile-derived graphite fibres.

40. The process of claim 36 or claim 37 wherein the conductive filler material comprises a mixture of carbon black and graphite fibres in a range of 10–70 wt % of the total composition.

41. The process of claim 36 or claim 37 wherein the elevated pressure is in the range from 25–2500 Kg/cm$^2$.

42. The process of claim 36 or claim 37 wherein during the elevated pressure step the temperature is in the range of 150°–750° C.

* * * * *